Oct. 20, 1964 B. LEO ETAL 3,153,465
DEVICE FOR SUCCESSIVELY IMMOBILIZING AND RENDERING
MOBILE A LOAD DISPLACEABLE WITHIN A CONDUIT
Filed Aug. 22, 1961 3 Sheets-Sheet 1
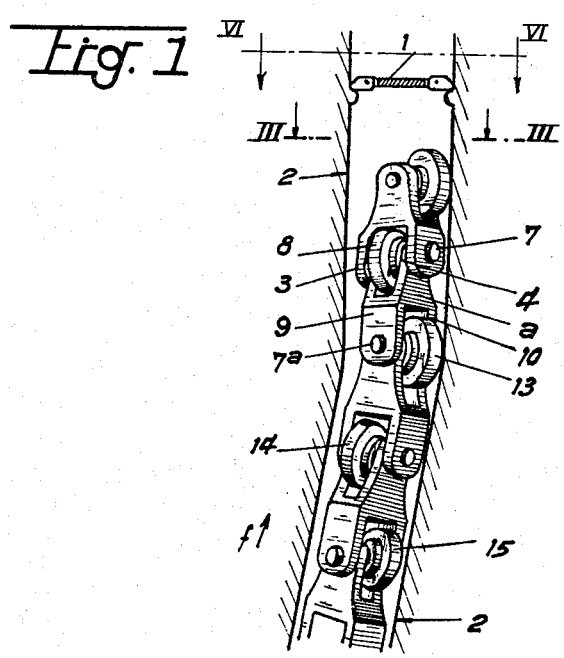
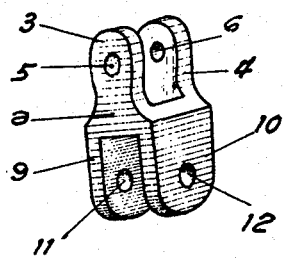
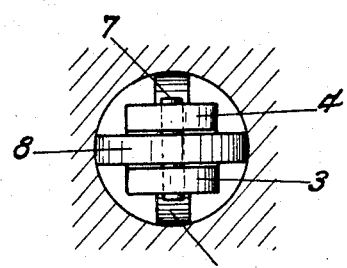
INVENTORS
BERTRAND LEO,
JEAN DELPLA, AND
PIERRE POUNHET
By Linton and Linton
ATTORNEYS

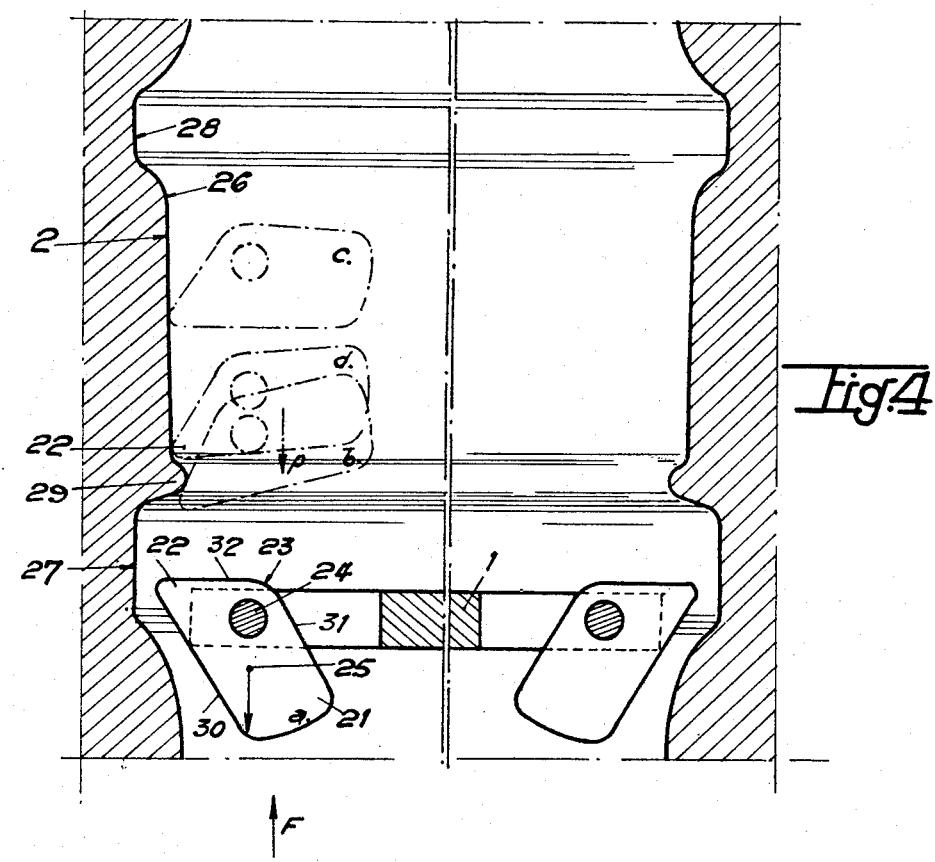

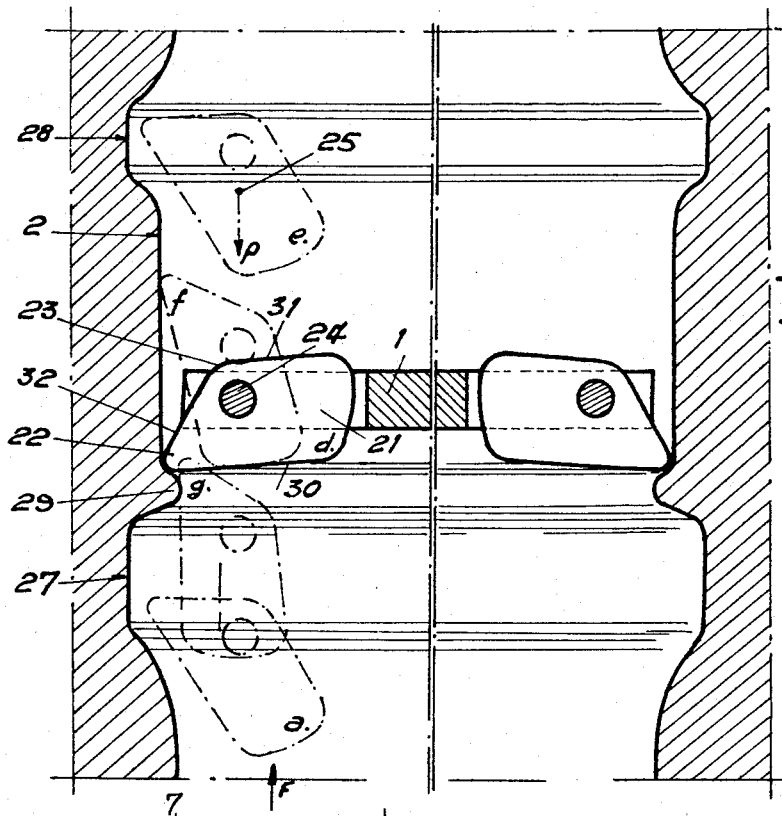
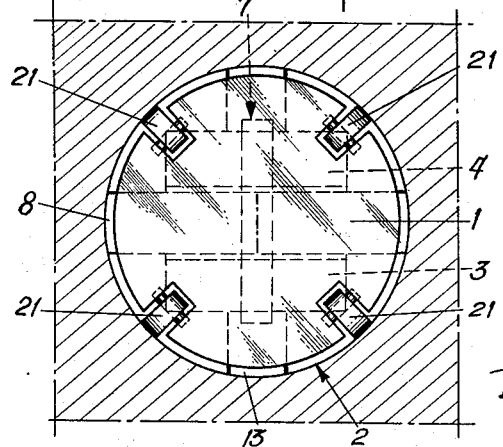

United States Patent Office 3,153,465
Patented Oct. 20, 1964

3,153,465
DEVICE FOR SUCCESSIVELY IMMOBILIZING AND RENDERING MOBILE A LOAD DISPLACEABLE WITHIN A CONDUIT
Bertrand Leo and Jean Delpla, Paris, and Pierre Pounhet, Saint-Brice, France, assignors to Electricite de France-Service National, Paris, France, a national organization of France
Filed Aug. 22, 1961, Ser. No. 133,244
Claims priority, application France, Mar. 6, 1958
759,880, Patent 1,173,868
4 Claims. (Cl. 187—76)

This application is a continuation-in-part of our application Serial No. 777,713 filed December 2, 1958.

The present invention relates to a device for successively retaining and releasing a load displaceable within a conduit.

A device serving for the purpose of successively immobilizing and then rendering movable a load which is intended to be displaced within a conduit is already well known. A device of this type basically comprises in combination with means enabling the load to be displaced in a conduit, at least one movable member directly or indirectly integral with the load, and a fixed member located at the point along the conduit at which it is desired to immobilize said load, said fixed member being capable of co-operating with said movable member so as to successively cause this latter member to move into a locked and then an unlocked position.

The movable member, which is directly or indirectly integral with the load, consists of two angular arms pivoted about a pin located at the point of junction of these two arms.

Said movable member is successively caused to move into the load-locking and unlocking position by co-operation with two grooves provided in the wall of the conduit. In addition, in order to ensure the immobilization of the load, the actual movement of this load was used in conjunction with the effect of gravity.

The principal object of the present invention is to provide a means for successively immobilizing and then rendering movable a load which is intended to be displaced within a conduit, in which at least one movable member is pivotally attached to the load or to the loading platform, and to provide the wall of said conduit with grooves which are each separated by an annular ridge, said grooves and intermediate ridges co-operating with said movable member, the axial lengths of said grooves and of said intermediate ridges with respect to said conduit, as well as the distances which separate them from one another, being predetermined independently of the shapes and dimensions of said movable member.

Further characteristic features of the present invention will be brought out by the description which follows below, reference being made to the accompanying drawings, which are given solely by way of example and not in any sense by way of limitation.

In these drawings,

FIG. 1 is a view in elevation and in partial cross-section, of an embodiment of the invention showing the successive positions taken up by the movable member for the purpose of immobilizing the load and the manner in which said load can be displaced;

FIG. 2 is a partial view of one link of the chain employed in accordance with FIG. 1 for the purpose of displacing the load;

FIG. 3 is a cross-section taken along the line III—III of FIG. 1;

FIG. 4 is a view in elevation on a larger scale and in partial cross-section, in which the chain has been omitted for the sake of greater simplicity and which shows the successive positions which result in the immobilization of the load;

FIG. 5 is a similar view showing the various positions occupied by the movable member during the load-shifting operation;

And FIG. 6 is a cross-sectional view taken on line VI—VI of FIG. 1.

As shown in FIGS. 1 to 3, and more especially in FIG. 1, the invention comprises a platform 1 fitted with a device which provides a means of immobilizing and subsequently imparting motion to said platform so that this latter can be displaced inside the conduit 2.

For this purpose there are provided means for producing action by applying a movement of thrust against the said platform 1, such means consisting either of a cable having a diameter which is smaller than that of the conduit 2 but which is very close to this latter, or, as shown in the drawings by way of example, an articulated chain. This chain comprises a certain number of links pivotally coupled to each other, each link being constituted as it were by two U-shaped members having a common web as shown at $a$ in FIG. 2 and the flanges of which are located in pairs at right angles to each other. The flanges 3 and 4 which are located in two parallel planes, are provided with orifices 5, 6 through which can be inserted a pin such as the pin designated by the reference 7 in FIGS. 1 and 3. This pin is intended to support a roller which is mounted to rotate freely, such as the roller 8.

The flanges 9 and 10 which are parallel to each other and at right angles to the flanges 3 and 4 are provided with orifices 11, 12 so as to permit the insertion of a pin 7a which is similar to the pin 7 but is consequently located at right angles to the said pin 7 and on which a roller 13 is mounted to rotate freely.

The hinged connection of the links to each other is carried into effect by reason of the fact that, as shown in FIG. 3, each pin such as the pin 7, 7a, etc. is also inserted through the corresponding orifices formed in the flanges of the adjoining link. In other words, on each pin there are pivotally mounted four flanges and one roller which is mounted to rotate freely. It is thus observed that the planes of the successive rollers such as the rollers 8, 13, 14, 15 are at right angles to each other, thereby permitting the chain to bear when necessary against four generator-lines of the conduit, and that the said chain is capable of adapting itself to any changes of direction. It is therefore merely necessary to urge the chain forward in the direction of the arrow $f$, starting from the bottom of the conduit 2, for the said chain to move easily inside the conduit 2 and for the chain in turn to displace the loading platform while thrusting against the bottom face of this latter.

The devices which serve to displace the chain in the direction of the arrow $f$ are well-known per se.

Reference being made to FIG. 4, the movable member 21 has two sides 30 and 31 contiguous to two end-portions 32 and 33, while the side 30 and end-portion 32 provide a corner or nose 22 having an acute angle, and the side 31 and the end-portion 32 provide a corner 23 having an obtuse angle. The nose 22 in particular forms a locking member, while the said movable member 21 is pivotally mounted on a platform 1 by means of a pivot 24 located in the vicinity of the corner 23. The movable member 21 being mounted to rotate freely about the pivot 24 and the center of gravity of said movable member being located at the point which is designated by the reference 25, it follows that the action of gravity will cause said movable member to adopt the position shown at $a$. The platform 1 may include a plurality of such movable members, for example three in number.

On the wall 26 of the conduit 2 are formed two grooves 27 and 28 and an intermediate ridge 29, said grooves and said intermediate ridge being formed either all the way round said conduit, or else only at those parts of said conduit which face opposite to the movable members such as, for example, the movable member 21.

Assuming that it is desired to immobilize a load inside the conduit, said load being displaced in the direction of the arrow F by any suitable means such as, for example, the chain of FIGS. 1 to 3, it will be seen that, when located opposite the groove 27, the movable member 21 adopts a natural position of equilibrium as shown at $a$ in FIG. 4. As the nose 22 passes over the ridge, the said nose is thrust downwards and the movable members takes up the position $b$ which it retains substantially up to $c$.

It will be easily appreciated that, under such conditions, if the loading platform is lowered once more under the effect of gravity, the position of the movable member will remain unchanged, since the latter bears against the wall of the conduit under the effect of the moment exerted by the weight $p$ of the movable member about the pivot 24. When the movable member reaches the position $d$ as shown in chain-dotted lines in FIG. 4, the nose 22 comes into abutment against the ridge 29 and locks the platform in position. The movable member accordingly acts after the manner of a quoin.

Assuming now that it is desired to move the load either upwards or downwards from the position $d$ which is illustrated in FIG. 5 in full lines, then all that is required is to shift the loading platform up to the position $e$ in which the nose 22 is located opposite the groove 28, whereupon the movable member 21 reverts to its natural position of equilibrium, thereby enabling the platform either to be raised still further or to be lowered once more, in which case the movable member successively takes up the positions $f$ and $g$, this latter position being that which the said movable member occupies at the moment of passing over the ridge 29, and returns finally to the position $a$, starting from which the platform may, of course, resume its descending movement.

It will be appreciated that, by virtue of its shape, the movable member 21 is extremely strong, thereby making it possible for relatively heavy loads to be immobilized.

The device in accordance with the present invention can be employed, for example, in an atomic pile, one of the conduits of such a pile being in this case represented by the conduit 2 shown in the drawings and modified for the purpose of the present invention. However, it will be appreciated that, the said conduit 2 can equally well be employed in various other devices as desired.

It is to be clearly understood that the present invention is in no way limited to the specific form of embodiment which has been described above with reference to the accompanying drawings and which has been given solely by way of example without any limitation being implied, and that on the contrary, many detail modifications may be made without thereby departing either from the scope or the spirit of the invention.

What we claim is:

1. A device for successively locking and releasing a load displaceable within a conduit comprising a conduit having a longitudinally extending inner side wall, a load supporting platform extending laterally of said conduit inner side wall and capable of being moved longitudinally of said conduit, said conduit inner side wall having a pair of lateral grooves and a ridge between said grooves, moveable members pivotally connected to said platform and capable of engaging said conduit inner side wall grooves and ridge upon movement of said platform for locking and releasing said platform, a moveable chain position in said conduit and having one end positioned for butting and moving said platform longitudinally of said conduit said chain including links each having two pair of longitudinal flanges with each pair of flanges extending perpendicular to the other pair of flanges, pins each pivotally connecting a pair of flanges of one link to a pair of flanges of an adjacent link and rollers each rotatably mounted on one end of said pins and riding on said conduit inner side wall for guiding said chain therealong.

2. A device for successively locking and releasing a load displaceable within a conduit, comprising a conduit having a lonigtudinally extending inner side wall, a load-supporting platform movably positioned in said conduit and capable of being moved longitudinally inside said conduit, at least one movable member having two sides contiguous to two end-portions, a corner having an acute angle formed between one of said end-portions and one side, and a corner having an obtuse angle formed between said end-portion and another side, means for pivotally attaching said movable member to said platform and located in the vicinity of said corner having an obtuse angle in such manner that said end-portion slidably contacts said inner side wall of said conduit, said movable member being free to pivot about said means for pivotal attachment to said platform, two grooves in said inner side wall which extend laterally inside said conduit and have a configuration such as to permit said movable member to pivot freely about said pivotal attachment means, between said two grooves a ridge formed on said inner side wall in such manner that, as a result of any movement of said platform, said ridge is contacted by that corner of said movable member which has an acute angle and prevents said platform from being displaced in one direction when moving in that direction, means for shifting said platform in said conduit and constituted by an articulated chain applying a movement of thrust against the bottom face of said platform, said chain including rollers with the planes of successive rollers being perpendicular to one another and links carrying said rollers each being pivotally connected to the next link on an axis perpendicular to the longitudinal axis of the chain.

3. A device for successively locking and releasing a load displaced within a conduit, comprising a conduit having a longitudinally extending inner side wall, a load-supporting platform movably positioned in said conduit and capable of being moved longitudinally inside said conduit, at least one movable member having two sides contiguous to two end-portions, a corner having an acute angle being formed between one of said end-portions and one side, and a corner having an obtuse angle formed between said end-portion and another side, means for pivotally attaching said movable member to said platform and located in the vicinity of said corner having an obtuse angle in such manner that said end-portion slidably contacts said inner side wall of said conduit, said movable member being free to pivot about said means for pivotal attachment to said platform, two grooves in said inner side wall which extend laterally inside said conduit and have a configuration such as to permit said movable member to pivot freely about said pivotal attachment means, between said two grooves a ridge formed on said inner side wall in such manner that, as a result of any movement of said platform, said ridge is contacted by that corner of said movable member which has an acute angle and prevents said platform from being displaced in one direction when moving in that direction, means for shifting said platform in said conduit and constituted by an articulated chain applying a movement of thrust against the bottom face of said platform, each link of said chain being constituted by two parallel flanges facing in opposite direction in planes at right angles to each other and joined together by a common web, each pair of parallel flanges being adapted to fit over the corresponding pair of flanges of the adjoining link.

4. A device for successively locking and releasing a load displaceable within a conduit, comprising a conduit having a longitudinally extending inner side wall, a load-supporting platform movably positioned in said conduit and capable of being moved longitudinally inside said conduit, means for shifting said platform longitudinally inside said conduit, at least one movable member having two sides contiguous to two end-portions, a corner having an acute angle formed between one of said end-portions and one side, and a corner having an obtuse angle formed between said end-portion and another side, means for pivotally attaching said movable member to said platform and located in the vicinity of said corner having an obtuse angle in such manner that said end-portion slidably contacts said inner side wall of said conduit, said movable member being free to pivot about said means for pivotal attachment to said platform, two grooves in said inner side wall which extend laterally inside said conduit and have a configuration such as to permit said movable member to pivot freely about said pivotal attachment means, between said two grooves a ridge formed on said inner side wall in such manner that, as a result of any movement of said platform, said ridge is contacted by that corner of said movable member which has an acute angle and prevents said platform from being displaced in one direction when moving in that direction, in which said means for shifting said platform inside said conduit are constituted by an articulated chain applying a movement of thrust against the bottom face of said platform, each link of said articulated chain being constituted by two parallel flanges facing in opposite direction in planes at right angles to each other and joined together by a common web, each pair of parallel flanges being adapted to fit over the corresponding pair of flanges of the adjoining link, a pin inserted through corresponding orifices formed in two corresponding pairs of flanges so as to pivotally couple said two corresponding pairs of flanges, a roller mounted to rotate freely on said pin and located at right angles to the roller of an adjoining link, thereby permitting said articulated chain to bear when necessary against four generator-lines of said conduit when displacing said loading platform.

References Cited in the file of this patent

UNITED STATES PATENTS

| | | |
|---|---|---|
| 343,404 | Smith | June 8, 1886 |
| 367,152 | Mahoney | July 26, 1887 |
| 371,437 | Dalton | Oct. 11, 1887 |
| 434,038 | White | Aug. 12, 1890 |
| 470,730 | Welter | Mar. 15, 1892 |
| 511,447 | Morris | Dec. 26, 1893 |
| 982,929 | Birch | Jan. 31, 1911 |
| 2,229,513 | Lustig | Jan. 21, 1941 |
| 2,229,615 | Van Voorhees | Jan. 21, 1941 |
| 2,684,129 | Joseph | July 20, 1954 |
| 2,956,643 | Halstead | Oct. 18, 1960 |

FOREIGN PATENTS

| | | |
|---|---|---|
| 810,119 | Germany | Aug. 6, 1951 |